United States Patent
Treweek et al.

(10) Patent No.: US 9,659,171 B2
(45) Date of Patent: May 23, 2017

(54) SYSTEMS AND METHODS FOR DETECTING TAMPERING OF AN INFORMATION HANDLING SYSTEM

(71) Applicant: Dell Products L.P., Round Rock, TX (US)

(72) Inventors: Lisa B. Treweek, Lakeway, TX (US); Christopher C. Dumas, Round Rock, TX (US); Alaric J. N. Silveira, Austin, TX (US)

(73) Assignee: Dell Producrs L.P., Round Rock, TX (US)

( * ) Notice: Subject to any disclaimer, the term of this patent is extended or adjusted under 35 U.S.C. 154(b) by 13 days.

(21) Appl. No.: 14/832,828

(22) Filed: Aug. 21, 2015

(65) Prior Publication Data
US 2017/0053116 A1 Feb. 23, 2017

(51) Int. Cl.
*G06F 21/00* (2013.01)
*G06F 21/55* (2013.01)
*G06F 21/45* (2013.01)

(52) U.S. Cl.
CPC ............ *G06F 21/554* (2013.01); *G06F 21/45* (2013.01); *G06F 2221/034* (2013.01)

(58) Field of Classification Search
CPC .................................................... G06F 21/554
USPC .......................................................... 726/18
See application file for complete search history.

(56) References Cited

U.S. PATENT DOCUMENTS

| | | | |
|---|---|---|---|
| 5,802,277 A | 9/1998 | Cowlard | |
| 6,571,335 B1 | 5/2003 | O'Donnell et al. | |
| 8,364,974 B2 | 1/2013 | Zimmer et al. | |
| 8,402,109 B2 | 3/2013 | Marino et al. | |
| 9,071,587 B2* | 6/2015 | Heninger | G06F 8/63 |
| 2006/0143600 A1 | 6/2006 | Cottrell et al. | |
| 2016/0004867 A1 | 1/2016 | Gillespie et al. | |
| 2016/0292205 A1* | 10/2016 | Massey | G06F 17/30371 |

* cited by examiner

*Primary Examiner* — Longbit Chai
(74) *Attorney, Agent, or Firm* — Jackson Walker L.L.P.

(57) ABSTRACT

In accordance with embodiments of the present disclosure, a method may include storing a system fingerprint of an information handling system, the system fingerprint comprising information associated with one or more information handling resources of the information handling system recorded during creation of the system fingerprint including information regarding a security seed, wherein the security seed comprises a value stored at a location of a non-transitory computer readable medium integral to an information handling resource of the one or more information handling resources. The method may also include during a verification mode, based on the information in the system fingerprint, determining whether potential tampering of the information handling system has occurred, and if potential tampering has occurred, issuing an alert indicating potential tampering with the information handling system.

21 Claims, 1 Drawing Sheet

SYSTEMS AND METHODS FOR DETECTING TAMPERING OF AN INFORMATION HANDLING SYSTEM

TECHNICAL FIELD

The present disclosure relates in general to information handling systems, and more particularly to detecting tampering of an information handling system, examples of many cases being between manufacturing of the information handling system to its delivery to an intended end user and subsequently after delivery to an intended end user.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many consumers of information handling resources are increasingly demanding that manufacturers of information handling systems provide assurances that an information handling system ordered from the manufacturer has not been tampered with prior to receipt by the customer, or after delivery. For example, without security measures in place, an interloper (e.g., a government intelligence agency, business competitor, or other person with harmful intent) could possibly intercept an information handling system during transit, and replace hardware and software components of the information handling system with malicious components intended to mimic the replaced components while performing some malicious operation (e.g., snooping data, data corruption, or snooping of the information handling system). Furthermore, even if an information handling system is delivered to an intended end user without tampering, such tampering may also occur (e.g., by a rogue employee, individual gaining unauthorized access, or other person with harmful intent). While many approaches have been employed (e.g., Trusted Platform Module) to ensure security of software during transit from manufacturer to intended end user, the industry still lacks an effective approach for providing such security with respect to hardware components and firmware residing on such components.

SUMMARY

In accordance with the teachings of the present disclosure, the disadvantages and problems associated with ensuring security of an information handling system may be reduced or eliminated.

In accordance with embodiments of the present disclosure, an information handling system may include a processor and a system fingerprint utility comprising a program of instructions executable by the processor. The system fingerprint utility may be configured to store a system fingerprint of the information handling system, the system fingerprint comprising information associated with one or more information handling resources of the information handling system recorded during creation of the system fingerprint including information regarding a security seed, wherein the security seed comprises a value stored at a location of a non-transitory computer readable medium integral to an information handling resource of the one or more information handling resources. The system fingerprint utility may also be configured to during a verification mode, based on the information in the system fingerprint, determine whether potential tampering of the information handling system has occurred, and if potential tampering has occurred, issue an alert indicating potential tampering with the information handling system.

In accordance with these and other embodiments of the present disclosure, a method may include storing a system fingerprint of an information handling system, the system fingerprint comprising information associated with one or more information handling resources of the information handling system recorded during creation of the system fingerprint including information regarding a security seed, wherein the security seed comprises a value stored at a location of a non-transitory computer readable medium integral to an information handling resource of the one or more information handling resources. The method may also include during a verification mode, based on the information in the system fingerprint, determining whether potential tampering of the information handling system has occurred, and if potential tampering has occurred, issuing an alert indicating potential tampering with the information handling system.

In accordance with these and other embodiments of the present disclosure, an article of manufacture may include a non-transitory computer readable medium and computer-executable instructions carried on the computer readable medium, the instructions readable by a processor. The instructions, when read and executed, may cause the processor to store a system fingerprint of an information handling system, the system fingerprint comprising information associated with one or more information handling resources of the information handling system recorded during creation of the system fingerprint including information regarding a security seed, wherein the security seed comprises a value stored at a location of a non-transitory computer readable medium integral to an information handling resource of the one or more information handling resources. The instructions may also cause the process to, during a verification mode, based on the information in the system fingerprint, determine whether potential tampering of the information handling system has occurred, and if potential tampering has occurred, issue an alert indicating potential tampering with the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
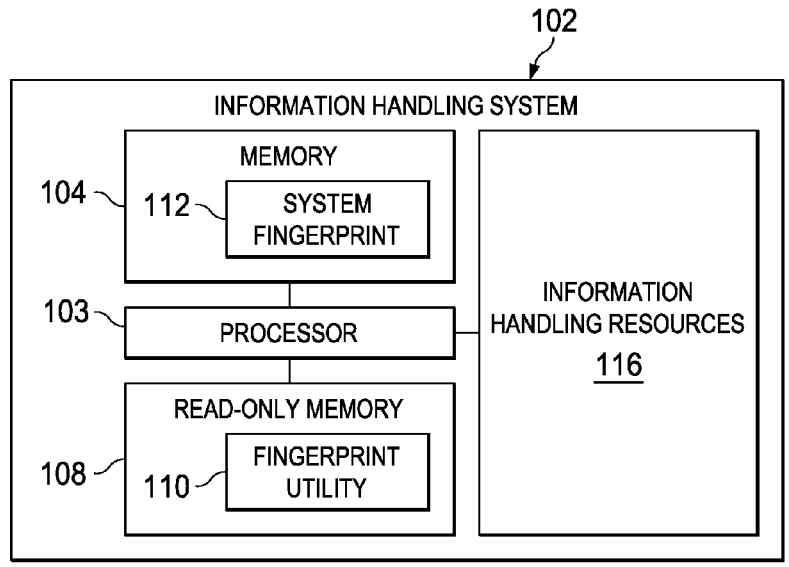
FIG. 1 illustrates a block diagram of an example information handling system, in accordance with embodiments of the present disclosure.
Figure 2:
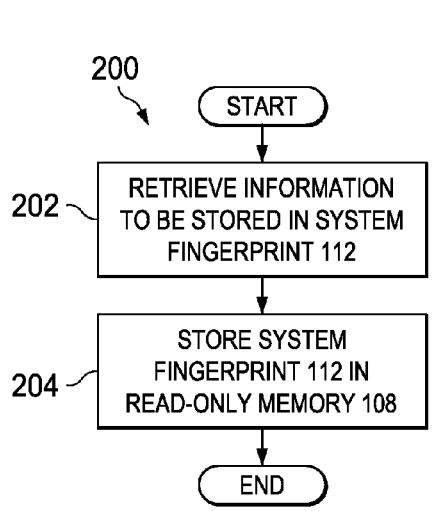
FIG. 2 illustrates a flow chart of an example method for storing a system fingerprint for an information handling system, in accordance with embodiments of the present disclosure.
Figure 3:
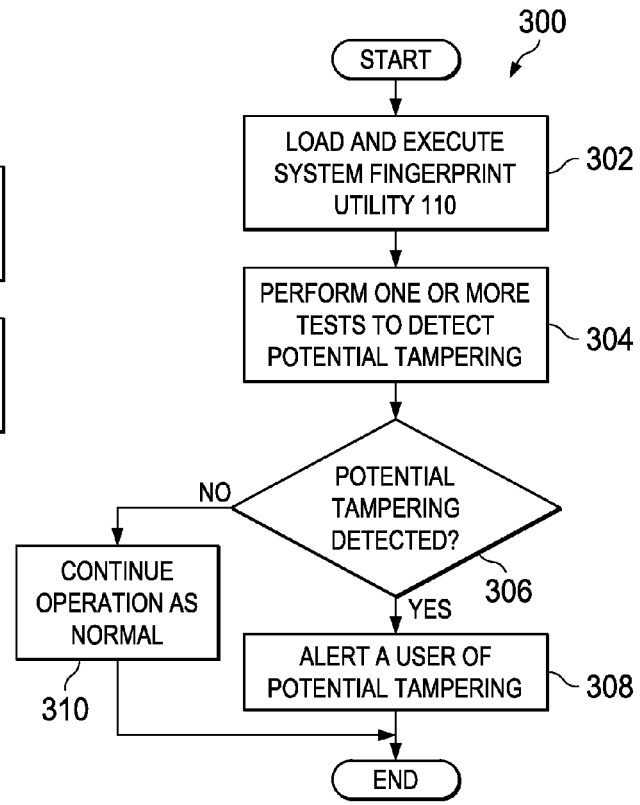
FIG. 3 illustrates a flow chart of an example method for verifying whether an information handling system has experienced tampering, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a read-only memory 108 communicatively coupled to processor 103, and one or more information handling resources 116 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, read-only memory 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may also include a system fingerprint 112 (e.g., stored in a non-volatile portion of memory 104). System fingerprint 112 may comprise any collection of data that may include identifying information of one or more components of hardware (e.g., processor 103, memory 104, read-only memory 108, other information handling resources 116, etc.) of information handling system 102. In some embodiments, such identifying information may include information that would be difficult for an interloper to mimic without expending significant amounts of time and/or resources. For example, system fingerprint 112 may include static data which have unique and unchanging values for each information handling system 102, such as a unique identifier (e.g., serial number, service tag, version number, etc.) of information handling system 102, unique identifiers (e.g., serial numbers, version numbers, etc.) of memory modules (e.g., dual-inline memory modules) or memory 104 installed in information handling system 102 by the manufacturer, unique identifiers (e.g., media access control addresses, version numbers, etc.) of network interface cards installed in information handling system 102 by the manufacturer, and/or any other suitable uniquely identifying characteristic of processor 103, memory 104, read-only memory 108, and/or another information handling resource 116 of information handling system 102.

In addition or alternatively, system fingerprint 112 may include signatures (e.g., hashes), checksums, or other similar information regarding firmware stored on various components of information handling system 102. In some embodiments, such a signature or checksum for a particular component may also be stored within the firmware or another memory location within such component.

In addition or alternatively, system fingerprint 112 may include one or more keys used for firmware encryption. For example, firmware for a particular component may be encrypted with a private key maintained by a manufacturer of such component, and system fingerprint 112 may include a public key provided by such manufacturer that corresponds to the private key.

In addition or alternatively, system fingerprint 112 may include information regarding one or more security seeds planted in a computer-readable medium integral to a component. To illustrate, a security seed may comprise data stored in a random location of a memory integral to a component (e.g., stored within the firmware code of the component or elsewhere in the component). In some embodiments, such security seed may comprise a security key associated with the component (e.g., public key corresponding to a private key associated with the component). Accordingly, system fingerprint 112 may include a memory location of the component which stores the security seed and an expected value of the security seed for comparison, as described in greater detail elsewhere in this disclosure.

Read-only memory 108 may be communicatively coupled to processor 103 and may include any system, device, or apparatus configured to permanently store program instructions and/or data, without being overwritten. For example, in some embodiments, read-only memory 108 may comprise flash memory on which rewritability has been disabled (e.g., by "burning out" write circuitry after an initial write).

As shown in FIG. 1, read-only memory 108 may include a system fingerprint utility 110. As described in greater detail elsewhere in this disclosure, system fingerprint utility 110 may include any system, device, or apparatus configured to create a system fingerprint 112 for information handling system 102 after its manufacture and before delivery to an intended end user, create an updated system fingerprint 112 for information handling system 102 after delivery to the intended end user in response to changes (e.g., hardware or firmware upgrades) made to information handling system 102, and/or to verify whether hardware of information handling system 102 has experienced tampering (e.g., during transit of the information handling system from a manufacturer to an intended end user or after delivery to the intended end user). In some embodiments, system fingerprint utility 110 may be implemented as a program of instructions that may be read by and executed on processor 103 to carry out the functionality of system fingerprint utility 110.

In addition, system fingerprint utility 110 may also be configured to execute scans for known system conflicts and/or known security risks. For example, such security risks may include security risks associated with a management controller (e.g., baseboard management controller, chassis management controller, enclosure controller, lifecycle controller, etc.) integral to information handling system 102. As another example, such security risks may include security risks associated with firmware of one or more components of information handling system 102.

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In addition to the various security features described above and below, a provider (e.g., manufacturer, vendor, etc.) of information handling system 102 may disable write circuitry of portions of one or more components of information handling system 102 in order to protect critical code (e.g., within firmware) or prevent tampering of such code.

FIG. 2 illustrates a flow chart of an example method for storing a system fingerprint 112 for information handling system 102, in accordance with embodiments of the present disclosure. According to one embodiment, method 200 may begin at step 202. As noted above, teachings of the present disclosure may be implemented in a variety of configurations of information handling system 102.

At step 202, once manufacture of information handling system 102 is complete (e.g., when all software and hardware components have been installed and configured according to an order of an intended end user), system fingerprint utility 110 may execute (e.g., during a special-purpose boot process of information handling system 102) in order to retrieve information to be stored in system fingerprint 112 and store such information (e.g., in memory 104 or another non-volatile computer-readable medium integral to or accessible by system fingerprint utility 110). For example, system fingerprint utility 110 may read identifying information (e.g., serial numbers, service tag numbers, model numbers, version numbers) of various components, calculate or otherwise obtain from components signatures or checksums of firmware integral to such components, obtain any keys used for firmware encryption, and/or obtain information regarding security seeds stored in a computer-readable media of a component (e.g., memory address location of security seed and/or value of security seed). In some embodiments, such information of system fingerprint 112 may be signed or encrypted (e.g., with a private key of the manufacturer), such that the information may later be decrypted by system fingerprint utility 110 (e.g., with a public key associated with the private key). In embodiments in which such encryption occurs, such signing may be performed by system fingerprint utility 110. In other embodiments in which such encryption occurs, system fingerprint utility 110 may deliver the unsigned key to a key management server (not shown) which signs the profile information and system fingerprint 112 and delivers signed system fingerprint 112 back to information handling system 102.

At step 204, system fingerprint utility 110 or another component of information handling system 102 may store system fingerprint 112 in memory 104. After completion of step 204, information handling system 102 may be delivered by any mix of trusted or untrusted entities prior to its final intended destination.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the description of method 200 contemplates that method 200 is executed prior to delivery of an information handling system to an intended end user, in some embodiments method 200 or a similar method may execute in response to a user indication to update system fingerprint 112 after delivery to the intended end user. The intended end user may desire to perform an update to system fingerprint 112 for numerous reasons, including updating system fingerprint 112 in response to an authorized change of one or more components of information handling system 102 and/or firmware thereof. In some embodiments, to execute such functionality of method 200 to update system fingerprint 112, an end user may be required to provide a key (e.g., a public key provided by the manufacturer of information handling system 102).

In transit between the manufacturer and the intended end user and/or while unattended after delivery to the intended end user, information handling system 102 is susceptible to attack from potential interlopers. Accordingly, it may be desirable to verify whether or not such an attack has occurred.

FIG. 3 illustrates a flow chart of an example method 300 for verifying whether information handling system 102 has experienced tampering, in accordance with embodiments of the present disclosure. According to one embodiment, method 300 may begin at step 302. As noted above, teachings of the present disclosure may be implemented in a variety of configurations of information handling system 102.

At step 302, system fingerprint utility 110 may load and begin executing on processor 103 in a verification mode. In some embodiments, system fingerprint utility 110 may be configured to load and execute on a first boot of information handling system 102 occurring after delivery, and thus information handling system 102 may be configured by its manufacturer to enable such first-boot execution of system fingerprint utility 110. In these and other embodiments, system fingerprint utility 110 may be configured to execute in response to a user command (e.g., pressing of a "hot key" or typing of a particular pattern of keys during a boot of information handling system 102). In these and other embodiments, system fingerprint utility 110 may be configured to (e.g., based on a setting of user preference) execute on a periodic basis (e.g., during each boot cycle, daily, weekly, etc.).

At step 304, system fingerprint utility 110 may perform one or more tests to determine if, based on information stored within system fingerprint 112, any potential tampering has occurred to information handling system 102. In some embodiments, such one or more tests may comprise generating another system fingerprint for components then present within information handling system 102 in a manner similar to step 202 of method 200, and then comparing the stored system fingerprint 112 to the newly-generated system fingerprint. In other embodiments, such one or more tests may comprise comparing information stored in system fingerprint 112 to analogous information for the various components of information handling system 102. Such comparisons may include, without limitation, comparisons of identifying information (e.g., serial numbers, service tag numbers, model numbers, version numbers, etc.) stored within system fingerprint 112 to identifying information of components of information handling system 102, comparisons of signatures and checksums stored within system fingerprint 112 to signatures and checksums of components of information handling system 102, and/or determinations of whether a memory address of a component set forth in system fingerprint 112 includes a security seed equivalent in value to a value for the security seed stored in system fingerprint 112.

At step 306, if potential tampering is found based on the one or more tests, method 300 may proceed to step 308. Otherwise, method 300 may proceed to step 310.

At step 308, in response to finding potential tampering, system fingerprint utility 110 may alert a user of potential tampering. Such alert may comprise an audible alert, a visual message (e.g., to a user interface display), an email message delivered to the user, and/or any other suitable alert. In some embodiments, the alert may include an indication of which component was potentially tampered with and/or an indication of the potential tampering that occurred. After step 308, method 300 may end.

At step 310, in response to finding no potential tampering, operation of information handling system 102 may continue as normal. After completion of step 310, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Although the methods and systems above contemplate a system fingerprint 112 stored to an information handling system 102 by a manufacturer, methods and systems identical and similar to those described herein may also be used such that after an intended end-user customizes and/or configures an information handling system, the end user could perform steps similar to those disclosed herein to create a system fingerprint 112 such that the end user could ensure that no tampering has occurred after the user's customization and/or configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a hardware processor;
   a read-only memory communicatively coupled to the hardware processor; and
   a system fingerprint utility comprising a program of instructions embodied in the read-only memory, executable by the hardware processor, and configured to:
   store a system fingerprint of the information handling system in the read-only memory, the system fingerprint comprising information associated with one or more information handling resources of the information handling system other than the read-only memory recorded during creation of the system fingerprint including information regarding a security seed, wherein the security seed comprises a value stored at a location of a non-transitory computer readable medium integral to an information handling resource of the one or more information handling resources other than the read-only memory; and
   during a verification mode:
   based on the information in the system fingerprint, determine whether an indication of tampering of the information handling system has occurred, wherein the verification comprises generating another new system fingerprint for components within the information handling system and comparing the stored system fingerprint to the newly-generated system fingerprint; and
   if the indication of tampering has occurred, issue an alert indicating the indication of tampering with the information handling system.

2. The information handling system of claim 1, wherein the system fingerprint is created by a manufacturer of the information handling system prior to delivery of the information handling system to its intended end user.

3. The information handling system of claim 1, wherein the system fingerprint is created after delivery of the information handling system to its intended end user in response to a request by a user to create the system fingerprint.

4. The information handling system of claim 1, wherein determining whether potential tampering of the information handling system has occurred comprises:
   generating a new system fingerprint based on the one or more information handling resources; and
   comparing the new system fingerprint to the system fingerprint.

5. The information handling system of claim 1, wherein determining whether potential tampering of the information handling system has occurred comprises:
   reading the value stored at the location; and
   comparing the value stored at the location to a corresponding value for the security seed stored within the system fingerprint.

6. The information handling system of claim 1, wherein the security seed comprises a key.

7. The information handling system of claim 1, wherein the information stored in the system fingerprint comprises one or more of:
   identifying information of the one or more information handling resources;
   a signature of firmware stored on the one or more information handling resources;
   a checksum of firmware stored on the one or more information handling resources; and
   a key for encrypting firmware stored on the one or more information handling resources.

8. A method comprising:
   storing a system fingerprint of an information handling system in a read-only memory, the system fingerprint comprising information associated with one or more information handling resources of the information handling system other than the read-only memory recorded during creation of the system fingerprint including information regarding a security seed, wherein the security seed comprises a value stored at a location of a non-transitory computer readable medium integral to an information handling resource of the one or more information handling resources other than the read-only memory; and
   during a verification mode:
   based on the information in the system fingerprint, determining whether an indication of tampering of the information handling system has occurred, wherein the verification comprises generating another new system fingerprint for components within the information handling system and comparing the stored system fingerprint to the newly-generated system fingerprint; and
   if the indication of tampering has occurred, issuing an alert indicating the indication of tampering with the information handling system.

9. The method of claim 8, wherein the system fingerprint is created by a manufacturer of the information handling system prior to delivery of the information handling system to its intended end user.

10. The method of claim 8, wherein the system fingerprint is created after delivery of the information handling system to its intended end user in response to a request by a user to create the system fingerprint.

11. The method of claim 8, wherein determining whether potential tampering of the information handling system has occurred comprises:
    generating a new system fingerprint based on the one or more information handling resources; and
    comparing the new system fingerprint to the system fingerprint.

12. The method of claim 8, wherein determining whether potential tampering of the information handling system has occurred comprises:
    reading the value stored at the location; and
    comparing the value stored at the location to a corresponding value for the security seed stored within the system fingerprint.

13. The method of claim 8, wherein the security seed comprises a key.

14. The method of claim 8, wherein the information stored in the system fingerprint comprises one or more of:
    identifying information of the one or more information handling resources;
    a signature of firmware stored on the one or more information handling resources;
    a checksum of firmware stored on the one or more information handling resources; and
    a key for encrypting firmware stored on the one or more information handling resources.

15. An article of manufacture comprising:
    a non-transitory computer readable medium; and
    computer-executable instructions carried on the computer readable medium, the instructions readable by a hardware processor, the instructions, when read and executed, for causing the hardware processor to:

store a system fingerprint of an information handling system in a read-only memory, the system fingerprint comprising information associated with one or more information handling resources of the information handling system other than the read-only memory recorded during creation of the system fingerprint including information regarding a security seed, wherein the security seed comprises a value stored at a location of a non-transitory computer readable medium integral to an information handling resource of the one or more information handling resources other than the read-only memory; and during a verification mode:

based on the information in the system fingerprint, determine whether an indication of tampering of the information handling system has occurred, wherein the verification comprises generating another new system fingerprint for components within the information handling system and comparing the stored system fingerprint to the newly-generated system fingerprint; and if the indication of tampering has occurred, issue an alert indicating the indication of tampering with the information handling system.

16. The article of claim 15, wherein the system fingerprint is created by a manufacturer of the information handling system prior to delivery of the information handling system to its intended end user.

17. The article of claim 15, wherein the system fingerprint is created after delivery of the information handling system to its intended end user in response to a request by a user to create the system fingerprint.

18. The article of claim 15, wherein determining whether potential tampering of the information handling system has occurred comprises:

generating a new system fingerprint based on the one or more information handling resources; and comparing the new system fingerprint to the system fingerprint.

19. The article of claim 15, wherein determining whether potential tampering of the information handling system has occurred comprises:

reading the value stored at the location; and comparing the value stored at the location to a corresponding value for the security seed stored within the system fingerprint.

20. The article of claim 15, wherein the security seed comprises a key.

21. The article of claim 15, wherein the information stored in the system fingerprint comprises one or more of:

identifying information of the one or more information handling resources;

a signature of firmware stored on the one or more information handling resources;

a checksum of firmware stored on the one or more information handling resources; and a key for encrypting firmware stored on the one or more information handling resources.

* * * * *